(12) United States Patent  
Rasband et al.

(10) Patent No.: US 9,204,320 B1  
(45) Date of Patent: Dec. 1, 2015

(54) END NODE PERSONAL DEFINITION AND MANAGEMENT

(71) Applicants: Paul B. Rasband, Lantana, FL (US); Stewart E. Hall, Wellington, FL (US)

(72) Inventors: Paul B. Rasband, Lantana, FL (US); Stewart E. Hall, Wellington, FL (US)

(73) Assignee: Tyco Fire & Security GmbH, Neuhausen Am Rheinfall (CH)

( * ) Notice: Subject to any disclaimer, the term of this patent is extended or adjusted under 35 U.S.C. 154(b) by 0 days.

(21) Appl. No.: 14/596,542

(22) Filed: Jan. 14, 2015

Related U.S. Application Data

(60) Provisional application No. 61/988,985, filed on May 6, 2014.

(51) Int. Cl.
  *H04W 4/00* (2009.01)
  *H04W 24/02* (2009.01)
  *H04W 84/18* (2009.01)

(52) U.S. Cl.
  CPC .............. *H04W 24/02* (2013.01); *H04W 84/18* (2013.01)

(58) Field of Classification Search
  CPC ............................... H04W 24/02; H04W 84/18
  See application file for complete search history.

(56) References Cited

U.S. PATENT DOCUMENTS

| | | | |
|---|---|---|---|
| 6,735,630 B1 | 5/2004 | Gelvin et al. | |
| 2006/0173975 A1* | 8/2006 | Nose | G06F 8/65 709/219 |
| 2007/0287396 A1* | 12/2007 | Huang | G06F 8/65 455/185.1 |
| 2008/0010631 A1* | 1/2008 | Harvey | G06F 8/60 717/131 |
| 2008/0164979 A1* | 7/2008 | Otto | A61B 5/0002 340/286.01 |
| 2011/0231535 A1* | 9/2011 | Starnes | H04W 4/001 709/223 |
| 2011/0289473 A1* | 11/2011 | Koyama | G06Q 10/06 717/101 |

FOREIGN PATENT DOCUMENTS

CN          1633098 A      6/2005

OTHER PUBLICATIONS

English machine translation of foreign reference CN1633098A (Source: Google Patents, http://google.com/patents/CN1633098A?cl=en).

* cited by examiner

*Primary Examiner* — Clemence Han
(74) *Attorney, Agent, or Firm* — Robert J. Sacco; Carol E. Thorstad-Forsyth; Fox Rothschild, LLP

(57) ABSTRACT

Systems (100) and methods (200) for dynamically managing Functional Configurations ("FCs") of network nodes (104, 134-138). The methods involve performing operations by a First End Node ("FEN") in accordance with a first FC. FEN (104) has a first Software Module ("SM") stored thereon specifying the first FC. The first SM (122) comprises a total set of codes/functions which determine how a network node is to behave. The first EN detects a trigger event for triggering a transition from the first FC to a second FC. In response to the trigger event, the FEN automatically and dynamically obtains, from a remote network node (134, 136, 138 or 144), a second SM (150 or 126) that is different than the first SM. The first SM (stored on FEN) is then replaced with the second SM. The FEN executes the second SM such that it operates in accordance with the second FC.

20 Claims, 4 Drawing Sheets

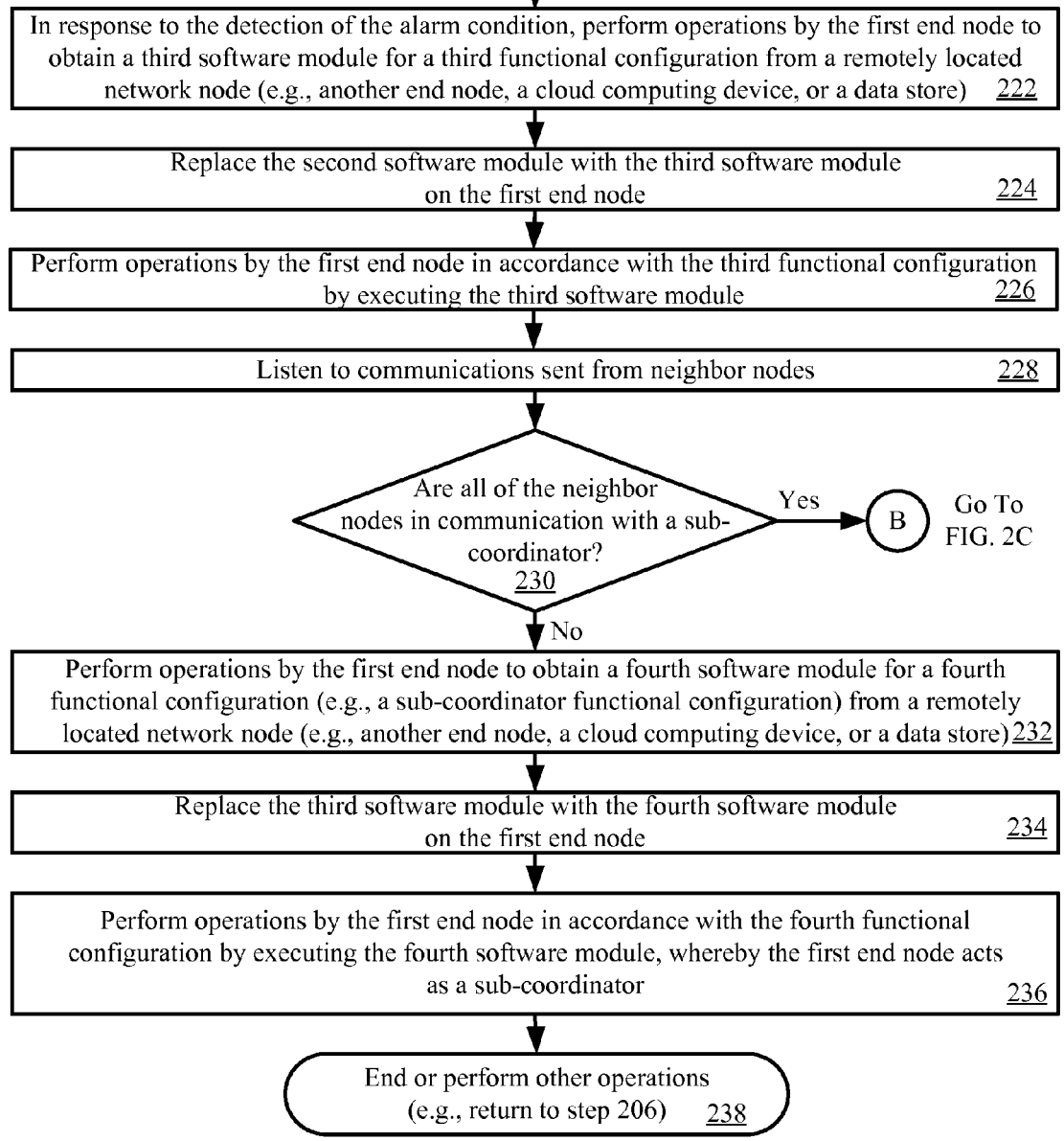

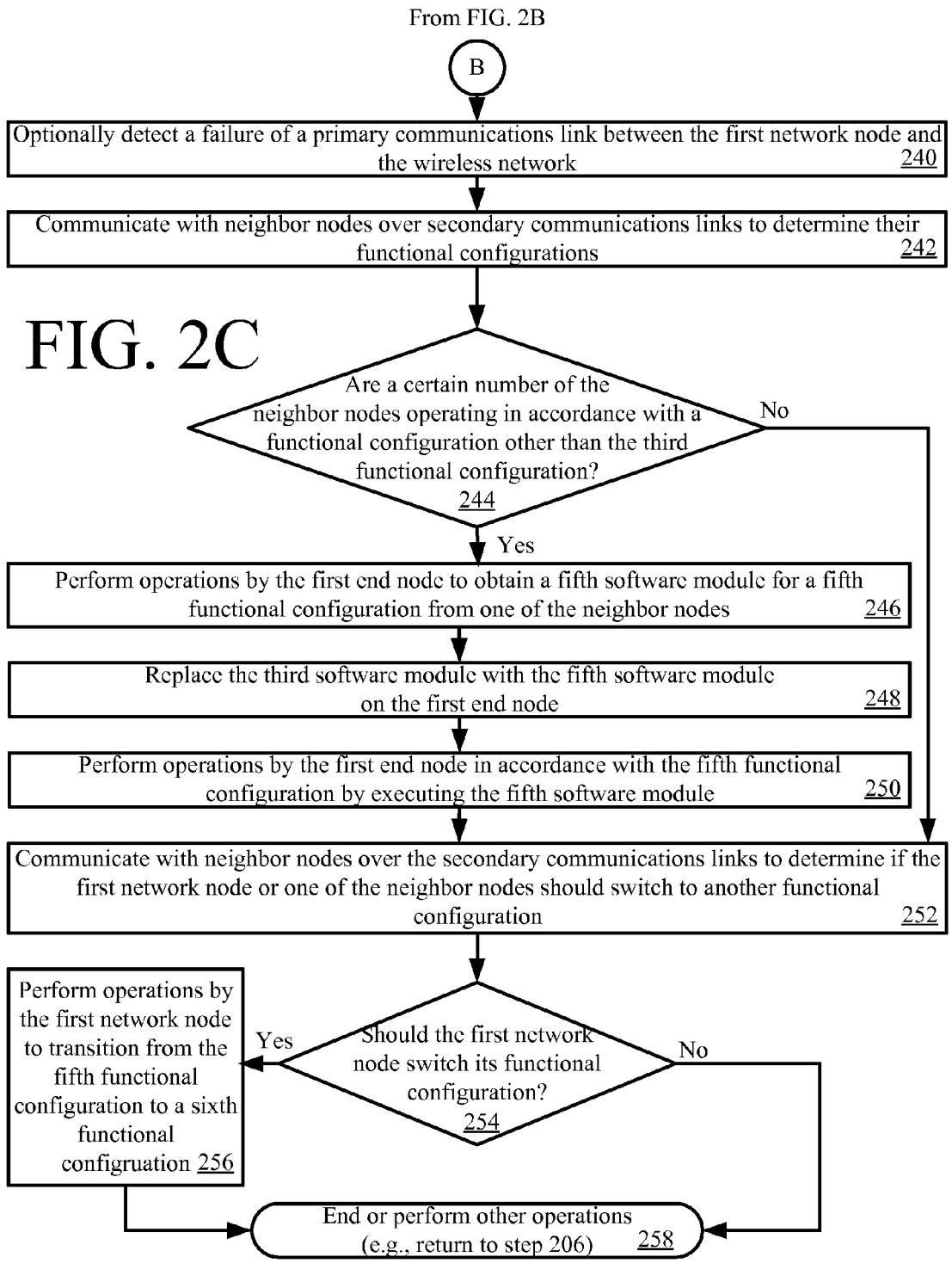

END NODE PERSONAL DEFINITION AND MANAGEMENT

CROSS-REFERENCE TO RELATED APPLICATIONS

This application claims priority to U.S. Patent Application No. 61/988,985, filed May 6, 2014. The content of the above application is incorporated by reference in its entirety.

FIELD OF THE INVENTION

This document relates generally to end node personal definition and management. More particularly, this document relates to systems and methods for managing a collection of end nodes in a wireless network.

BACKGROUND OF THE INVENTION

Wireless sensor networks involving low-cost, low-duty-cycle end nodes have traditionally placed most of the flexibility requirements (variability in modes of behavior), to the extent that such variability exists, in the higher-functionality access points/gateways/network coordinators which manage the collection of end nodes, rather than in the end nodes themselves. In such networks, the end nodes have a single set of simple software applications, sensors, sensor filter programs, reports, etc. which define their behavior. That is, the end nodes are static. In recent years, some variability has been introduced into the behavior of end nodes in some advanced networks (e.g., using firmware which can be changed via wireless boot loading). These end nodes are dynamic in the sense that their behavior can be changed, but there exists a great deal of complexity in managing these behaviors and generally the changes are kept very simple.

SUMMARY OF THE INVENTION

The present disclosure concerns implementing systems and methods for dynamically managing functional configurations of network nodes. The methods involve performing operations by a first end node of a wireless network in accordance with a first functional configuration. The first end node has a first software module stored thereon specifying the first functional configuration. The first software module comprises a total set of codes and functions which determine how a network node is to behave during a given period of time.

Sometime thereafter, the first end node detects a first trigger event for triggering a transition of the first end node's operations from the first functional configuration to a second functional configuration. In response to the first trigger event, the first end node automatically and dynamically obtains, from a remote network node, a second software module that is different than the first software module. The remote network node comprises a second end node, a cloud computing device or a data store of said wireless network. The first software module (stored on the first end node) is then replaced with the second software module. At this time, the first end node executes the second software module such that it operates in accordance with the second functional configuration.

In some scenarios, the first trigger event comprises: a detection of an emergency condition in a surrounding environment by the first end node or another network node; and/or an interception of an alarm message communicated between a second end node and a third end node. The alarm message is processed by the first end node to infer an alarm condition. The alarm condition is inferred based on at least one of: the first end node's estimated proximity to an origin of the alarm message; a number of intercepted alarm messages within a period of time; a damping factor broadcast to at least one of said network nodes by at least one access point of said wireless network; and tuning factors derived by optimization algorithms operating on past false positive and false negative alarm incidents.

In those or other scenarios, the trigger event comprises: a determination that at least one neighbor node is not in communication with a sub-coordinator node of the wireless network, and the second functional configuration comprises a sub-coordinator functional configuration; a determination that a current number of sub-networks within the wireless network falls below a threshold value, and the second functional configuration comprises a sub-coordinator functional configuration; a detection that a total number of neighbor nodes operating in accordance with the second functional configuration exceeds a first threshold value; and/or a communications link failure between the first end node and another network node of the wireless network.

DESCRIPTION OF THE DRAWINGS

Embodiments will be described with reference to the following drawing figures, in which like numerals represent like items throughout the figures, and in which:

FIGS. 2A-2C (collectively referred to as "FIG. 2") provide a flow diagram of an exemplary method for dynamically managing functional configurations of end nodes of a wireless network.

DETAILED DESCRIPTION OF THE INVENTION

Figure 1:
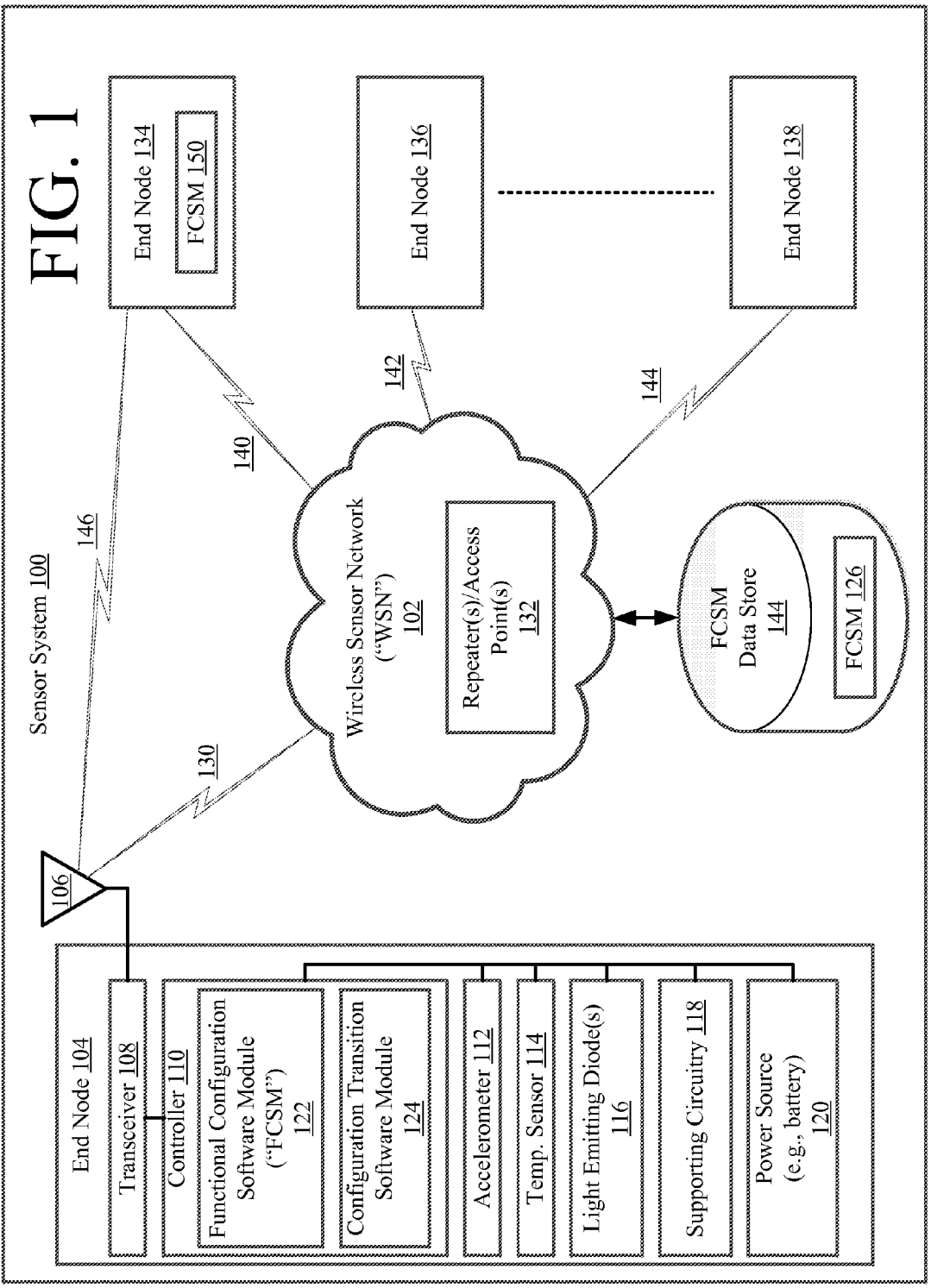
FIG. 1 is a schematic illustration of an exemplary sensor system that is useful for understanding the present invention.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

The present disclosure concerns systems and methods for managing a collection of end nodes in a Wireless Sensor Network ("WSN") in which the role and basic makeup of the end nodes must depend on context. This management technique goes beyond managing the "state" of the end nodes (as is the case where the end nodes' operations are governed by a state machine). Rather, this management technique involves varying an entire set of rules and capabilities of the end nodes with a switch. The switch may be controlled in a number of ways as described below. To facilitate this, a functional configuration (or persona) for each end node is defined as comprising (1) a set of executable functions which process sensor data using specific rules (e.g., sensor data filters), (2) specific code and reports to send via messages to other network nodes, and (3) specific access codes and protocols which determine the end nodes priority in a competitive process of gaining network access for those messages. In other words, an end node's functional configuration (or persona) is the total set of codes and functions which determine how it behaves during a given period of time. Notably, the functional configuration (or persona) does not include codes, protocols, and executables that are common to all nodes in the WSN at all times, without change. A special set of management functions can be loaded into the firmware of each end node or into a remote software proxy that includes rules and defined trigger events for conversion (or transition) from one functional configuration (or persona) to another functional configuration (or persona). Each time a functional configuration transition is to occur a software module specifying the new functional configuration is provided to the end node. The software module can be provided from a cloud-computing device, a centralized data store of the WSN, or another node of the WSN (e.g., the end node's parent (coordinator or sub-coordinator) node or a neighbor end node).

Referring now to FIG. 1, there is provided a schematic illustration of an exemplary sensor system 100. Sensor system 100 is generally configured to act as a security and access control system, fire monitoring system, person or asset location system, etc. In this regard, sensor system 100 comprises a plurality of end nodes 104, 134, 136, 138 and a WSN 102. The WSN 102 may include, but is not limited to, a mesh network. Mesh networks are well known in the art, and therefore will not be described herein. Still, it should be understood that the mesh network comprises a plurality of sub-networks. If an end node's communication link with a particular sub-network fails, then the end node can automatically join another sub-network within the WSN 102.

The end nodes can include, but are not limited to, electronic window locks, electronic door locks, motion sensors (e.g., coupled to equipment), area security devices (e.g., proximity sensors and/or video cameras), fire detectors and/or electronic access cards worn by employees. Each of the listed types of end nodes is well known in the art, and therefore is not described in detail herein. Each end node can be of any type.

In FIG. 1, end node 104 is shown as including an electronic access card worn by an employee. The present invention is not limited in this regard. Since end node 104 includes an electronic access card, it comprises an antenna 106, a transceiver 108, a controller 110, an accelerometer 112, a temperature sensor 114, a Light Emitting Diode ("LED") 116, supporting circuitry 118 and a power source (e.g., a battery) 120. The antenna 106 and transceiver 108 facilitate communications with the WSN 102 and/or other end nodes via respective wireless communication links 130, 140-146.

At any given time, end node 104 is configured to perform specified functions (e.g., collecting sensor data, capturing images, collecting audio, emitting light, filtering data, analyzing data, transmitting data, outputting indictors, executing algorithms, acting as a sub-coordinator, etc.) for which it has been configured. The functions are specified in a Functional Configuration Software Module ("FCSM") 122 stored therein and executed by the controller 110 thereof. The controller 110 can constitute machine-readable media or medium. The term "machine-readable media or medium" shall be taken to include any medium that is capable of storing, encoding or carrying a set of instructions for execution by a machine and that cause the machine to perform any one or more of the methodologies of the present disclosure.

During operation, end node 104 may detect a trigger event for triggering its transition from a current functional configuration to a new functional configuration. The trigger event may include, but is not limited to: detection of an emergency condition in a surrounding environment (e.g., a fire in a building) by the end node or another network node; interception of an alarm message communicated between at least two other end nodes (e.g., end nodes 134-138); detection that the number of neighbor nodes operating in accordance with the same functional configuration (which is different than the current functional configuration of the end node 104) exceeds a threshold value; a communications link failure (e.g., with a parent node); a determination that the current number of sub-networks exceeds or falls below a threshold value; an interrupt occurrence on an input pin of the controller 110; and/or an expiration of a timer.

Upon the occurrence of a trigger event, end node 104 performs operations for transitioning from its current functional configuration to a new functional configuration. The transitioning is achieved by obtaining a FCSM 150 or 126 specifying the new functional configuration from another network device (e.g., another end node 134, 136, or 138), a cloud device (not shown) or a FCSM data store 144, in response to the detection of the trigger event. In this case, the FCSM 150 or 126 replaces the FCSM 122 within the end node 104. As such, end node 104 comprises a single FCSM at any given time. Thus, the functional configuration of end node 104 is dynamically modifiable in response to the occurrence of trigger events. This is also true for the other end nodes 134-138.

For example, let's assume that end node 104 has FCSM for a first functional configuration stored therein during a first time period, and a FCSM for a second functional configuration stored therein during a second time period. In accordance with the first functional configuration, the end node 104 never uses the temperature sensor 114 or accelerometer 112 during the first time period, except for infrequent capabilities testing (e.g., damage checks once per week). Also, the end node 104 sends relatively infrequent messages (e.g., once per hour) to check-in with the WSN 102 and to determine the end node's location within a facility. The end node's location can be determined based on the signal strength sensed by a collection of wireless network repeaters/access points 132 located throughout the facility. The LED 116 is off during the entire first period of time. The controller 110 is in its sleep mode virtually all of the time (when not performing the above-mentioned tasks). In accordance with the second functional configuration, the controller 110 continuously measures temperature and frequently downloads data from the accelerometer 112 (e.g., 10-100 times per second). The LED 116 is on or flashing during the entire second period of time. Node location and status messages are frequently sent (e.g., many times per minute) from end node 104 to the nearest collection of repeaters/access points 132. The nodes location can be determined using triangulation, accelerometer data and/or signal strength. The present invention is not limited to the particulars of this example.

As an integral part of the persona change, the changing node may request specific code modules, allowed upon consideration of its new authorizations and wireless network security clearances, from one or multiple surrounding local and/or cloud devices, including particularly other nodes in the WSN. Those new software functions may be installed and run without node rebooting so that the persona change occurs rapidly. This dynamic programming may be facilitated by particular software operating systems characteristics that allow the installation and running of small or moderate size functions without traditional boot loading. This is part of a scheme which allows large scale, controlled and rapid persona changes of all, most or some of the nodes in the WSN with network bandwidth being conserved due to the fact that the newly required software functions are staged (or cached) close to the end nodes that might require them during persona change.

Figure 2A:
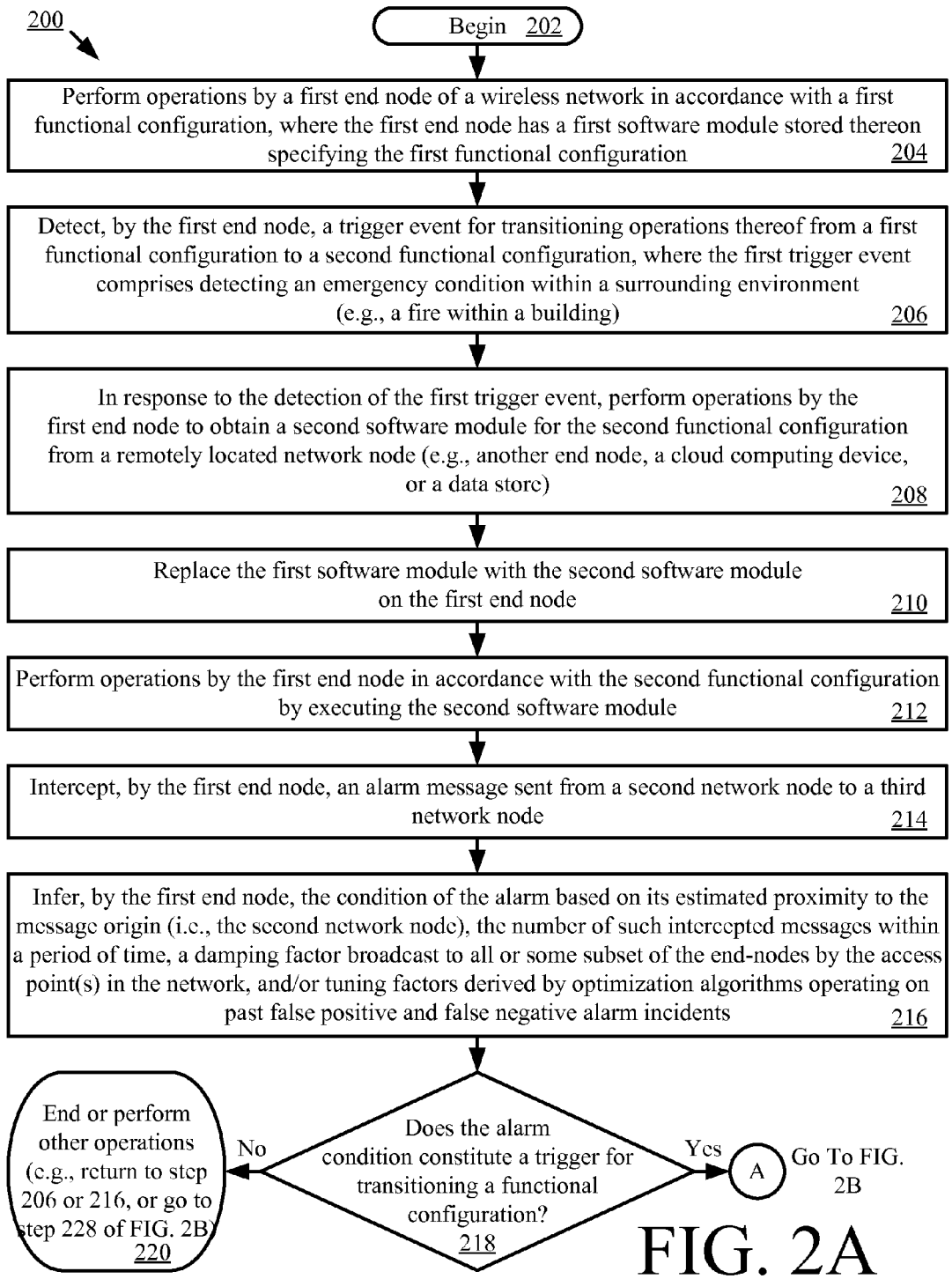

Referring now to FIGS. 2A-2C, there is provided a flow diagram of an exemplary method 200 for dynamically managing functional configurations of end nodes of a wireless network. Method 200 begins with step 202 and continues with step 204 where a first end node (e.g., end node 104 of FIG. 1) of a WSN (e.g., WSN 102 of FIG. 1) performs operations in accordance a first functional configuration. In this regard, the first end node has a first software module (e.g., FCSM 122 of FIG. 1) stored thereon specifying the first functional configuration. The first software module is executed by the first end node such that it operates in accordance with the first functional configuration. In some scenarios, the first software module comprises firmware.

Sometime thereafter, the first network node detects a trigger event for transitioning operations thereof from the first functional configuration to a second functional configuration, as shown by step 206. The trigger event comprises a detection of an emergency condition within a surrounding environment (e.g., a fire in a building). In response to the detection of the trigger event, the first end node performs operations in step 208 to obtain a second software module (e.g., FCSM 150 or 126 of FIG. 1) for the second functional configuration from a remotely located network node. The second software module can be obtained from another end node (e.g., end node 134 of FIG. 1), a cloud computing device (not shown in FIG. 1) or a data store (e.g., FCSM data store 144 of FIG. 1). In a next step 210, the first software module is replaced with the second software module on the first end node. Consequently, the first end node begins operating in accordance with the second functional configuration by executing the second software module, as shown by step 212.

Subsequently in step 214, the first end node intercepts an alarm message sent from a second network node (e.g., end node 134 of FIG. 1) to a third network node (e.g., end node 136 or 138 of FIG. 1). The end node then processes the alarm message to infer the condition of the alarm, as shown by step 216. The condition of the alarm can be inferred based on: the first end nodes estimated proximity to the message origin (i.e., the second network node); the number of such intercepted messages within a period of time; a damping factor broadcast to all or some subset of the end-nodes by the access point(s) in the network; and/or the tuning factors derived by optimization algorithms operating on past false positive and false negative alarm incidents.

If the alarm condition does not constitute a trigger for transitioning functional configurations [218:NO], then step 220 is performed where method 200 ends or other operations are performed. For example, method 200 may return to step 206 or 216. Alternatively, method 200 may continue to step 228 of FIG. 2B, which will be discussed below.

In contrast, if the alarm condition does constitute a trigger for transitioning functional configurations [218:YES], then method 200 continues with step 222 of FIG. 2B. Step 222 involves performing operations by the first end node to obtain a third software module for a third functional configuration from a remotely located network node (e.g., another end node, a cloud computing device, or a data store). The third software module replaces the second software module on the first network node, as shown by step 224. As such, in a next step 226, the first end node executes the third software module, whereby it operates in accordance with the third functional configuration.

Thereafter in step 228, the first end node listens to communications sent from neighbor nodes. If all of the neighbor nodes are not in communication with a sub-coordinator [230:NO], then steps 232-238 are performed. These steps involve: performing operations by the first end node to obtain a fourth software module for a fourth functional configuration (e.g., a sub-coordinator functional configuration) from a remotely located network node (e.g., another end node, a cloud computing device, or a data store); replacing the third software module with the fourth software module on the first end node; and performing operations by the first end node in accordance with the fourth functional configuration by executing the fourth software module, whereby the first end node acts as a sub-coordinator. Sub-coordinator operations are well known in the art, and therefore will not be described in detail herein. Still, it should be understood that a sub-coordinator node acts as a router. As such, the sub-coordinator node may have address assignment authority, as well as one or more children nodes for which it directs communications thereto from other network nodes and therefrom to other network nodes. Thereafter, method 200 ends or other operations are performed (e.g., return to step 206).

In contrast, if all of the neighbor nodes are in communication with a sub-coordinator [230:NO], then method 200 continues with optional step 238 of FIG. 2C where the first end node detects a failure of its primary communications link (e.g., communications link 130 of FIG. 1) with the WSN. In response to said detection, the first network node communicates with its neighbor nodes over secondary communications links (e.g., communications link 146 of FIG. 1), as shown by step 240. These communications are performed for purposes of determining the functional configurations of the neighbor nodes.

If a certain number of the neighbor nodes are not operating in accordance with a functional configuration other than the third functional configuration [244:NO], then method 200 continues with step 252 which will be described below. In contrast, if a certain number of the neighbor nodes are operating in accordance with a functional configuration other than the third functional configuration [244:YES], then steps 246-250 are performed. These steps involve: performing operations by the first end node to obtain a fifth software module for a fifth functional configuration from one of the neighbor nodes; replacing the third software module with the fifth software module on the first end node; and performing operations by the first end node in accordance with the fifth functional configuration by executing the fifth software module.

Upon completing step 250, step 252 is performed where the first end node communicates with the neighbor nodes over the secondary communications links to determine if it or one of the neighbor nodes should switch to another functional configuration. If the first network node should not switch its functional configuration [254:NO], then method 200 continues with step 258 which will be described below. In contrast, if the first network node should switch its functional configuration [254:YES], then step 256 is performed where the first network node transitions from the fifth functional configuration to a sixth functional configuration. Subsequently, step 258 is performed where method 200 ends or other operations are performed (e.g., return to step 206).

As evident from the above discussion, the present disclosure covers situations in which node hardware is generalized (i.e., given many types of sensors) and the functional configuration (or persona) set available to the end nodes covers many types of fixed infrastructure nodes (specially purposed for motion sensing, temperature sensing, message repeating, message sniffing/jammer detection, voice recognition and detection, still image rapid processing, etc.). Each of these very different node behaviors is designated and managed as a specific functional configuration (or persona), and the functional configuration (or persona) chosen by a given network node or assigned to that network node by another network node is determined by context sensitive event filters.

All of the apparatus, methods, and algorithms disclosed and claimed herein can be made and executed without undue experimentation in light of the present disclosure. While the invention has been described in terms of preferred embodiments, it will be apparent to those having ordinary skill in the art that variations may be applied to the apparatus, methods and sequence of steps of the method without departing from the concept, spirit and scope of the invention. More specifically, it will be apparent that certain components may be added to, combined with, or substituted for the components described herein while the same or similar results would be achieved. All such similar substitutes and modifications apparent to those having ordinary skill in the art are deemed to be within the spirit, scope and concept of the invention as defined.

The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

We claim:

1. A method for dynamically managing functional configurations of network nodes, comprising:
    performing operations by a first end node of a wireless network in accordance with a first functional configuration, where the first end node has a first software module stored thereon specifying the first functional configuration, where the first software module comprises a total set of codes and functions which determine how a network node is to behave during a given period of time;
    detecting by the first end node a first trigger event for triggering a transition of the first end node's operations from the first functional configuration to a second functional configuration;
    in response to said first trigger event, automatically and dynamically obtaining from a remote network node a second software module that is different than the first software module;
    replacing the first software module stored on the first end node with the second software module; and
    executing the second software module at the first end node such that the first end node operates in accordance with said second functional configuration specified by the second software module;
    wherein the first trigger event comprises at least one of (a) detection of an emergency condition in a surrounding environment, (b) interception of an alarm message, (c) determination that at least one neighbor node is not in communication with a sub-coordinator node of the wireless network, (d) determination that a current number of sub-networks within said wireless network falls below a first threshold value, (e) detection that a total number of neighbor nodes operating in accordance with the second functional configuration exceeds a second threshold value, and (f) an interrupt occurrence on an input pin of the first end node.

2. The method according to claim 1, wherein the remote network node comprises a second end node, a cloud computing device or a data store of said wireless network.

3. A method for dynamically managing functional configurations of network nodes, comprising:
    performing operations by a first end node of a wireless network in accordance with a first functional configuration, where the first end node has a first software module stored thereon specifying the first functional configuration, where the first software module comprises a total set of codes and functions which determine how a network node is to behave during a given period of time
    detecting by the first end node a first trigger event for triggering a transition of the first end node's operations from the first functional configuration to a second functional configuration;
    in response to said first trigger event, automatically and dynamically obtaining from a remote network node a second software module that is different than the first software module;
    replacing the first software module stored on the first end node with the second software module; and
    executing the second software module at the first end node such that the first end node operates in accordance with said second functional configuration specified by the second software module;
    wherein said first trigger event comprises a detection of an emergency condition in a surrounding environment by the first end node or another network node.

4. A method for dynamically managing functional configurations of network nodes, comprising:
 performing operations by a first end node of a wireless network in accordance with a first functional configuration, where the first end node has a first software module stored thereon specifying the first functional configuration, where the first software module comprises a total set of codes and functions which determine how a network node is to behave during a given period of time,
 detecting by the first end node a first trigger event for triggering a transition of the first end node's operations from the first functional configuration to a second functional configuration;
 in response to said first trigger event, automatically and dynamically obtaining from a remote network node a second software module that is different than the first software module;
 replacing the first software module stored on the first end node with the second software module; and
 executing the second software module at the first end node such that the first end node operates in accordance with said second functional configuration specified by the second software module;
 wherein said trigger event comprises an interception of an alarm message communicated between a second end node and a third end node.

5. The method according to claim 4, further comprising processing the alarm message by the first end node to infer an alarm condition.

6. The method according to claim 5, wherein the alarm condition is inferred based on at least one of: the first end node's estimated proximity to an origin of the alarm message; a number of intercepted alarm messages within a period of time; a damping factor broadcast to at least one of said network nodes by at least one access point of said wireless network; and tuning factors derived by optimization algorithms operating on past false positive and false negative alarm incidents.

7. A method for dynamically managing functional configurations of network nodes, comprising:
 performing operations by a first end node of a wireless network in accordance with a first functional configuration, where the first end node has a first software module stored thereon specifying the first functional configuration, where the first software module comprises a total set of codes and functions which determine how a network node is to behave during a given period of time;
 detecting by the first end node a first trigger event for triggering a transition of the first end node's operations from the first functional configuration to a second functional configuration;
 in response to said first trigger event, automatically and dynamically obtaining from a remote network node a second software module that is different than the first software module;
 replacing the first software module stored on the first end node with the second software module; and
 executing the second software module at the first end node such that the first end node operates in accordance with said second functional configuration specified by the second software module;
 wherein the trigger event comprises a determination that at least one neighbor node is not in communication with a sub-coordinator node of the wireless network, and the second functional configuration comprises a sub-coordinator functional configuration.

8. A method for dynamically managing functional configurations of network nodes, comprising:
 performing operations by a first end node of a wireless network in accordance with a first functional configuration, where the first end node has a first software module stored thereon specifying the first functional configuration, where the first software module comprises a total set of codes and functions which determine how a network node is to behave during a given period of time;
 detecting by the first end node a first trigger event for triggering a transition of the first end node's operations from the first functional configuration to a second functional configuration;
 in response to said first trigger event, automatically and dynamically obtaining from a remote network node a second software module that is different than the first software module;
 replacing the first software module stored on the first end node with the second software module; and
 executing the second software module at the first end node such that the first end node operates in accordance with said second functional configuration specified by the second software module;
 wherein the trigger event comprises a determination that a current number of sub-networks within said wireless network falls below a threshold value, and the second functional configuration comprises a sub-coordinator functional configuration.

9. A method for dynamically managing functional configurations of network nodes, comprising:
 performing operations by a first end node of a wireless network in accordance with a first functional configuration, where the first end node has a first software module stored thereon specifying the first functional configuration, where the first software module comprises a total set of codes and functions which determine how a network node is to behave during a given period of time;
 detecting by the first end node a first trigger event for triggering a transition of the first end node's operations from the first functional configuration to a second functional configuration;
 in response to said first trigger event, automatically and dynamically obtaining from a remote network node a second software module that is different than the first software module;
 replacing the first software module stored on the first end node with the second software module; and
 executing the second software module at the first end node such that the first end node operates in accordance with said second functional configuration specified by the second software module;
 wherein the trigger event comprises a detection that a total number of neighbor nodes operating in accordance with the second functional configuration exceeds a first threshold value.

10. A method for dynamically managing functional configurations of network nodes, comprising:
 performing operations by a first end node of a wireless network in accordance with a first functional configuration, where the first end node has a first software module stored thereon specifying the first functional configuration, where the first software module comprises a total set of codes and functions which determine how a network node is to behave during a given period of time;

detecting by the first end node a first trigger event for triggering a transition of the first end node's operations from the first functional configuration to a second functional configuration;

in response to said first trigger event, automatically and dynamically obtaining from a remote network node a second software module that is different than the first software module;

replacing the first software module stored on the first end node with the second software module; and executing the second software module at the first end node such that the first end node operates in accordance with said second functional configuration specified by the second software module;

wherein the trigger event comprises a communications link failure between the first end node and another network node of said wireless network.

11. A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein the first trigger event comprises at least one of (a) detection of an emergency condition in a surrounding environment, (b) interception of an alarm message, (c) determination that at least one neighbor node is not in communication with a sub-coordinator node of the wireless network, (d) determination that a current number of sub-networks within said wireless network falls below a first threshold value, (e) detection that a total number of neighbor nodes operating in accordance with the second functional configuration exceeds a second threshold value, and (f) an interrupt occurrence on an input pin of the first end node.

12. The system according to claim 11, wherein the remote network node comprises a second end node, a cloud computing device or a data store.

13. ,A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein said first trigger event comprises a detection of an emergency condition in a surrounding environment by the first end node or another network node.

14. A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein said trigger event comprises an interception of an alarm message communicated between a second end node and a third end node.

15. The system according to claim 14, wherein the first end node further processes the alarm message to infer an alarm condition.

16. The system according to claim 15, wherein the alarm condition is inferred based on at least one of: the first end node's estimated proximity to an origin of the alarm message; a number of intercepted alarm messages within a period of time; a damping factor broadcast to at least one of said network nodes by at least one access point of said wireless network; and tuning factors derived by optimization algorithms operating on past false positive and false negative alarm incidents.

17. A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein the trigger event comprises a determination that at least one neighbor node is not in communication with a sub-coordinator node of the wireless network, and the second functional configuration comprises a sub-coordinator functional configuration.

18. A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein the trigger event comprises a determination that a current number of sub-networks within said wireless network falls below a threshold value, and the second functional configuration comprises a sub-coordinator functional configuration.

19. A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein the trigger event comprises a detection that a total number of neighbor nodes operating in accordance with the second functional configuration exceeds a first threshold value.

20. ,A system, comprising:

a first end node configured to:

perform operations in accordance with a first functional configuration, where the first end node has a first software module stored thereon specifying the first functional configuration, and the first software module comprises a total set of codes and functions which determine how a network node is to behave during a given period of time;

detect a first trigger event for triggering a transition from the first functional configuration to a second functional configuration;

in response to said first trigger event, automatically and dynamically obtain from a remote network node a second software module that is different than the first software module;

replace the first software module stored on the first end node with the second software module; and execute the second software module such that the first end node operates in accordance with said second functional configuration specified by the second software module;

wherein the trigger event comprises a communications link failure between the first end node and another network node of said wireless network.

* * * * *